(12) United States Patent
Condessa et al.

(10) Patent No.: US 11,657,290 B2
(45) Date of Patent: May 23, 2023

(54) SYSTEM AND METHOD WITH A ROBUST DEEP GENERATIVE MODEL

(71) Applicant: Robert Bosch GmbH, Stuttgart (DE)

(72) Inventors: Filipe Cabrita Condessa, Pittsburgh, PA (US); Jeremy Zico Kolter, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 758 days.

(21) Appl. No.: 16/665,110

(22) Filed: Oct. 28, 2019

(65) Prior Publication Data
US 2021/0125107 A1    Apr. 29, 2021

(51) Int. Cl.
*G06F 21/64* (2013.01)
*G06N 3/084* (2023.01)
*G06N 20/10* (2019.01)
*G06F 18/241* (2023.01)

(52) U.S. Cl.
CPC .......... *G06N 3/084* (2013.01); *G06F 18/241* (2023.01); *G06F 21/64* (2013.01); *G06N 20/10* (2019.01)

(58) Field of Classification Search
CPC .... G06N 20/10; G06N 3/0472; G06N 3/0454; G06N 3/084; G06F 21/64; G06K 9/6268
USPC .......................................................... 706/12
See application file for complete search history.

(56) References Cited

U.S. PATENT DOCUMENTS

| | | | |
|---|---|---|---|
| 10,270,591 B2* | 4/2019 | Brockmann | H04L 9/0897 |
| 10,324,467 B1* | 6/2019 | Abeloe | G06N 3/084 |
| 11,374,952 B1* | 6/2022 | Coskun | G06N 3/0454 |
| 2015/0096057 A1* | 4/2015 | Kiefer | H04L 63/105 726/29 |
| 2016/0364553 A1* | 12/2016 | Smith | H04L 63/10 |
| 2019/0318206 A1* | 10/2019 | Smith | G01S 17/58 |
| 2019/0370257 A1* | 12/2019 | Wolf | G06F 16/24537 |

(Continued)

OTHER PUBLICATIONS

Kingma et al., "Auto-Encoding Variational Bayes," arXiv:1312.6114v10 [stat.ML], 14 pages, May 1, 2014.

(Continued)

*Primary Examiner* — Hicham Skhoun
(74) *Attorney, Agent, or Firm* — Kathy Takeguchi; Maginot, Moore & Beck LLP

(57) ABSTRACT

A machine learning system includes encoder and decoder networks. The machine learning system is configured to obtain input data, which includes sensor data and a radius of an $\ell_p$ norm ball of admissible perturbations. Input bounding data is generated based on the input data. First bounding data and second bounding data are generated by respectively propagating the input bounding data on first and second outputs of the encoder network. Third bounding data is generated in association with a latent variable based on the first bounding data and the second bounding data. Fourth bounding data is generated by propagating the third bounding data on an output of the decoder network. A robustness certificate is established with respect to the input data by generating a lower bound of an evidence lower bound based on the first, second, third, and fourth bounding data. The encoder and the decoder networks are updated based on the robustness certificate to provide robustness to the machine learning system with respect to defending against the admissible perturbations.

18 Claims, 7 Drawing Sheets

(56) References Cited

U.S. PATENT DOCUMENTS

| | | | | |
|---|---|---|---|---|
| 2020/0004933 | A1* | 1/2020 | Cocchi | G06F 21/78 |
| 2020/0242252 | A1* | 7/2020 | Chen | G06N 3/084 |
| 2020/0342326 | A1* | 10/2020 | Rahnama Moghaddam | |
| | | | | G06N 3/084 |
| 2021/0003380 | A1* | 1/2021 | Diehl | G01B 7/31 |
| 2021/0065063 | A1* | 3/2021 | Gazzetti | G06N 5/04 |
| 2021/0272304 | A1* | 9/2021 | Yang | G06T 7/536 |
| 2022/0237189 | A1* | 7/2022 | Park | G05D 23/1931 |

OTHER PUBLICATIONS

Gondim-Ribeiro et al., "Adversarial Attacks on Variational Autoencoders," arXiv:1806.04646v1 [cs.CV], 10 pages, Jun. 12, 2018.

Raghunathan et al., "Certified Defenses Against Adversarial Examples", arXiv:1801.09344v1 [cs.LG], 15 pages, Jan. 29, 2018.

Gowal et al., "On the Effectiveness of Interval Bound Propagation for Training Verifiably Robust Models," arXiv: 1810.12715v3 [cs.LG], 14 pages, Jan. 28, 2019.

* cited by examiner

SYSTEM AND METHOD WITH A ROBUST DEEP GENERATIVE MODEL

FIELD

This disclosure relates generally to machine learning systems, and more specifically to deep generative models that are robust to adversarial attacks.

BACKGROUND

In general, machine learning systems, such as deep neural networks, are susceptible to adversarial attacks. As an example, a machine learning system may be attacked via its input. Such adversarial attacks include perturbations on the input that cause a change in the output of the machine learning system. For instance, when the adversarial attacks relate to sensor data, the perturbations on the sensor data may cause the machine learning system to behave in a non-desired manner, for example, by providing incorrect output data, thereby resulting in negative consequences and effects. While there is some work relating to adversarial attacks in classification settings and, to a lesser extent, other supervised settings such as object detections or image segmentations, there does not appear to be much work with respect to providing generative models with defensive solutions to adversarial attacks.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes obtaining input data. The input data includes sensor data and a radius of an $\ell_p$ norm ball of admissible perturbations. The method includes generating input bounding data based on the input data. The method includes generating first bounding data and second bounding data by propagating the input bounding data on first and second outputs of an encoder network. The method includes generating third bounding data, which is associated with a latent variable and which is based on the output of the encoder network. The method includes generating fourth bounding data by propagating the third bounding data on an output of a decoder network. The method includes establishing a robustness certificate with respect to the input data by generating a lower bound of an evidence lower bound (ELBO) based on the first bounding data, the second bounding data, the third bounding data, and the fourth bounding data. The method includes updating the encoder network and the decoder network based on the robustness certificate such that the machine learning system, which includes the encoder network and the decoder network, is robust with respect to defending against the admissible perturbations.

According to at least one aspect, a system includes an actuator, a sensor system, a non-transitory computer readable medium, and a control system. The sensor system includes at least one sensor. The non-transitory computer readable medium stores a machine learning system having an encoder network and a decoder network that are trained based on a robustness certificate that lower bounds a loss function of the machine learning system. The control system is operable to control the actuator based on communications with the sensor system and the machine learning system. The control system includes at least one electronic processor that is operable to obtain input data that includes sensor data from the sensor system and perturbation data from a disturbance, wherein the sensor data is perturbed by the perturbation data. The input data is processed via the machine learning system. Output data is generated via the machine learning system. The output data is a reconstruction of the sensor data. The output data is associated with a likelihood that is unperturbed by the perturbation data. The likelihood corresponds to the ELBO. The sensor data and the output data are in-distribution data, which correspond to a model distribution associated with the machine learning system. The machine learning system identifies and processes the input data as being within a range of the in-distribution data even if the perturbation data is constructed to make the machine learning system identify and process the input data as being out-of-distribution data that is outside of the model distribution.

According to at least one aspect, a non-transitory computer readable medium includes at least computer-readable data, which when executed by an electronic processor, is operable to implement a method for training a machine learning system to be robust to perturbations. The method includes obtaining input data that includes sensor data and a radius of an $\ell_p$ norm ball of admissible perturbations. The method includes generating input bounding data based on the input data. The method includes generating first bounding data and second bounding data by propagating the input bounding data on first and second outputs of an encoder network. The method includes generating third bounding data, which is associated with a latent variable and which is based on the output of the encoder network. The method includes generating fourth bounding data by propagating the third bounding data on an output of a decoder network. The method includes establishing a robustness certificate with respect to the input data by generating a lower bound of an evidence lower bound (ELBO) based on the first bounding data, the second bounding data, the third bounding data, and the fourth bounding data. The method includes updating the encoder network and the decoder network based on the robustness certificate such that the machine learning system, which includes the encoder network and the decoder network, is robust with respect to defending against the admissible perturbations.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

As described herein, the embodiments relate to applications of provably robust trainings in the context of generative models. More specifically, the embodiments construct provable bounds in relation to loss functions in the context of unsupervised generative models rather than supervised classification tasks. In an example embodiment, for instance, the provably robust training relates to at least one generative model, such as a variational auto-encoder (VAE). In this regard, a certifiably, robust lower bound is defined on the variational lower bound of the likelihood, and then this lower bound is optimized during training to generate a provably robust VAE ("proVAE"). Also, these provably robust generative models are evaluated to be substantially more robust to adversarial attacks (e.g., an adversary trying to perturb inputs so as to drastically lower their likelihood under the generative model) compared to a control group of generative models.

Figure 1A:
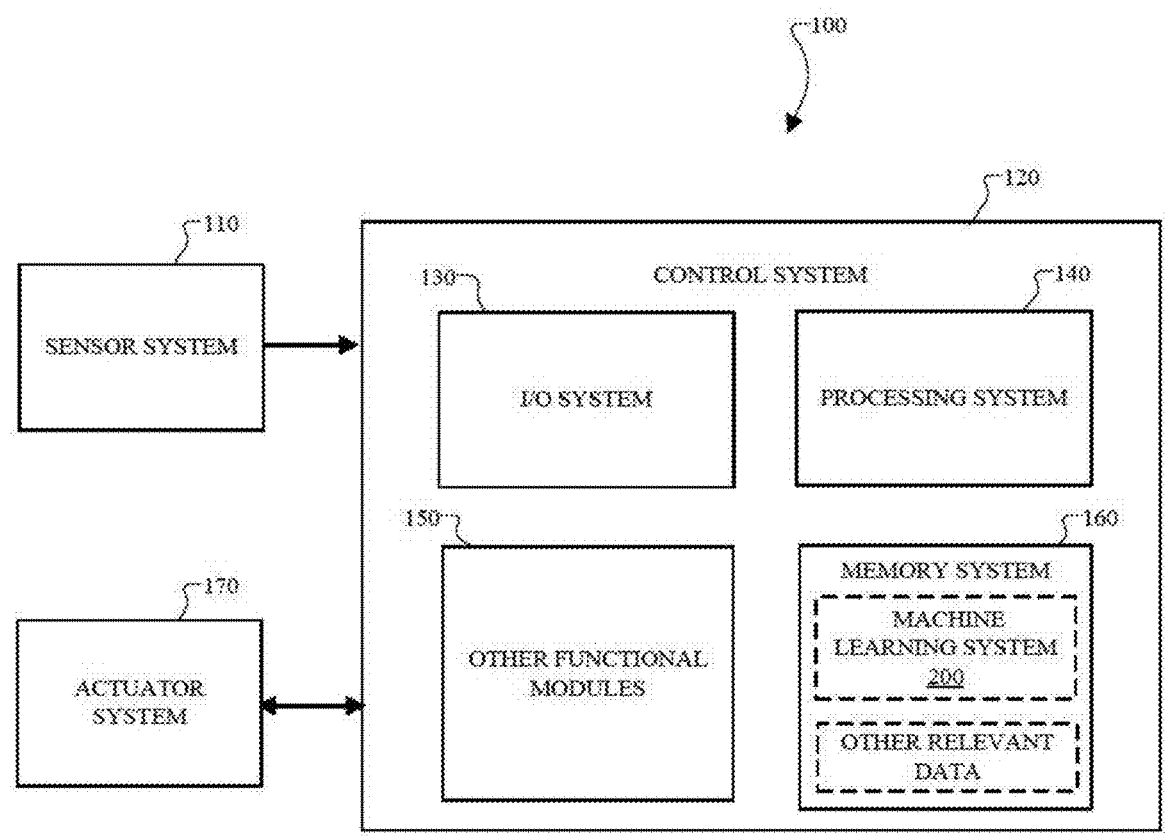
FIG. 1A is a diagram of a system that includes a machine learning system according to an example embodiment of this disclosure.

FIG. 1A illustrates a block diagram of a system 100 according to an example embodiment. The system 100 includes a sensor system 110 with one or more sensors. For example, the sensor system 110 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), any suitable sensor, or any combination thereof. The sensor system 110 is operable to communicate with the control system 120.

The control system 120 is configured to obtain the sensor data directly or indirectly from one or more sensors of the sensor system 110. Upon receiving input data (e.g., the sensor data and/or image data based on the sensor data), the control system 120 is configured to process this input data via a processing system 140 in connection with a machine learning system 200. In this regard, the processing system 140 includes at least one processor. For example, the processing system 140 includes an electronic processor, a central processing unit (CPU), a graphics processing unit (GPU), a microprocessor, a field-programmable gate array (FPGA), an application-specific integrated circuit (ASIC), any suitable processing technology, or any combination thereof. Upon processing this input data, the processing system 140 is operable to generate output data via the machine learning system 200. Additionally or alternatively, the processing system 140 is operable to generate classification data that classifies the output data of the machine learning system 200. Also, the processing system 140 is operable to provide control data to an actuator system 170 based on the classification data and/or the output data of the machine learning system 200.

In an example embodiment, the machine learning system 200 is stored in a memory system 160. In an example embodiment, the memory system 160 is a computer or electronic storage system, which is configured to store and provide access to various data to enable at least the operations and functionality, as disclosed herein. In an example embodiment, the memory system 160 comprises a single device or a plurality of devices. In an example embodiment, the memory system 160 can include electrical, electronic, magnetic, optical, semiconductor, electromagnetic, or any suitable technology. For instance, in an example embodiment, the memory system 160 can include random access memory (RAM), read only memory (ROM), flash memory, a disk drive, a memory card, an optical storage device, a magnetic storage device, a memory module, any suitable type of memory device, or any combination thereof. In an example embodiment, with respect to the control system 120 and/or processing system 140, the memory system 160 is local, remote, or a combination thereof (e.g., partly local and partly remote). For example, the memory system 160 can include at least a cloud-based storage system (e.g. cloud-based database system), which is remote from the processing system 140 and/or other components of the control system 120.

In an example embodiment, the machine learning system 200 includes at least one deep neural network. More specifically, the deep neural network includes at least one trained, provably robust generative model ("PROVAE"). In response to input data, the processing system 140 (in connection with the machine learning system 200) is operable to generate output data that is a reconstruction of the input data. For example, when the input data is sensor data (and/or image data based on the sensor data), the processing system 140 is operable to generate output data via the machine learning system 200 in which the output data is a reconstruction of the sensor data. As another example, when the input data includes sensor data (and/or image data based on the sensor data) that is perturbed by perturbation data, the processing system 140 is operable to generate output data via the machine learning system 200 in which the output data is a reconstruction of the sensor data, whereby the likelihood effects are not corrupted by the perturbation data.

This feature of the machine learning system 200 is advantageous in providing a defensive solution to adversarial attacks in that such perturbation data does not cause drastic changes in the likelihood effects and/or output data of the machine learning system 200.

In addition, the system 100 includes other components that contribute to an operation of the control system 120 in relation to the sensor system 110 and the actuator system 170. For example, as shown in FIG. 1, the memory system 160 is also configured to store other relevant data, which relates to operation of the system 100 in relation to one or more components (e.g., sensor system 110, machine learning system 200, actuator system 170, etc.) thereof. In addition, the control system 120 includes an input/output (I/O) system 130, which includes one or more interfaces to one or more I/O devices that relate to the system 100. Also, the control system 120 is configured to provide other functional modules 150, such as any appropriate hardware, software, or combination thereof that assist with or contribute to the functioning of the system 100. For example, the other functional modules 150 include an operating system and communication technology that enables components of the system 100 to communicate with each other as described herein. With at least the configuration discussed in the example of FIG. 1A, the system 100 is applicable in various technologies.

Figure 1B:
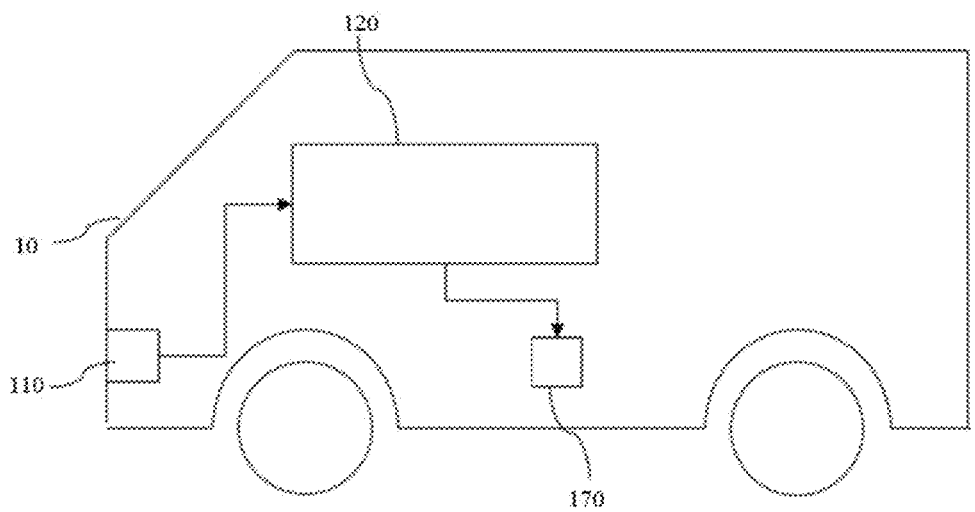
FIG. 1B is a diagram of an example of the system of FIG. 1A with respect to mobile machine technology according to an example embodiment of this disclosure.

FIG. 1B illustrates an example of a first application of the system 100 with respect to mobile machine technology (e.g., a robot, etc.). In FIG. 1B, the system 100 is employed by a vehicle 10 in which the control system 120 controls at least one actuator system 170 of the vehicle 10 in accordance with sensor data from the sensor system 110. More specifically, as a non-limiting example, the control system 120 is configured to identify an entity (e.g., object) using sensor data from the sensor system 110. For example, the system 100 is configured to identify a sign (e.g., a stop sign) upon obtaining image data from an image sensor. As another example, the system 100 is configured to detect a pedestrian from image data, which is generated based on sensor data obtained from an image sensor and a LIDAR sensor. In this regard, the sensor data is generated and/or obtained from one or more sensors of the sensor system 110. In this example, upon receiving at least the sensor data and/or image data, the processing system 140, via the machine learning system 200, is configured to identify the entity from the sensor data (and/or image data) upon estimating with a high value of likelihood that the sensor data (and/or image data) was generated based on a distribution associated with the entity and/or is in-distribution. Advantageously, the PROVAE 200A is configured to estimate a high value of likelihood even when the input data (e.g., sensor data and/or image data) is perturbed by a perturbation (e.g., noise), thereby being robust with respect to out-of-distribution attacks. For instance, as a non-limiting example, if the processing system 140, via the machine learning system 200, identifies another vehicle as an entity (within its model distribution) upon receiving unperturbed/perturbed input data that includes sensor data from the sensor system 110, then the control system 120 is configured to control an actuator system 170 (e.g., a steering system, braking system, or any suitable actuator system) to avoid colliding with this identified vehicle. In this example, the actuator system 170 is configured to control or assist with a diving function of a vehicle, which is autonomous, highly-autonomous, partially-autonomous, conditionally-autonomous, or driver-assisted.

Figure 1C:
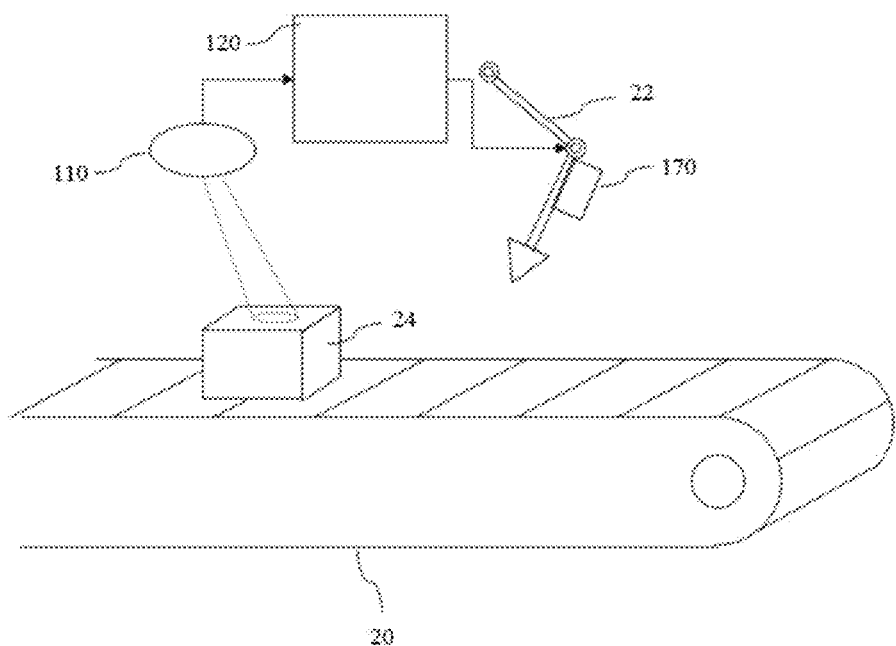
FIG. 1C is a diagram of an example of the system of FIG. 1A with respect to manufacturing technology according to an example embodiment of this disclosure.

FIG. 1C illustrates an example of a second application of the system 100 with respect to manufacturing technology. In FIG. 1C, the system 100 is employed by a manufacturing system 20 in which the control system 120 controls at least one actuator system 170 of the manufacturing machine 22 in accordance with sensor data from the sensor system 110. More specifically, as a non-limiting example, the control system 120 is configured to identify failures in products 24 by modeling a distribution of images of defective components of the products 24. In this case, PROVAE 200A is configured to identify defects or failures in components of products 24 even in cases in which the sensor data is perturbed by relatively small (and/or imperceptible) perturbations. For example, if perturbed input data includes an image of a defective component of a product 24, then the processing system 140, via the machine learning system 200, is configured to identify the product 24 as being defective and not identify the product 24 as being non-defective as intended by the perturbation data. In this case, in response to the processing of this perturbed input data, the control system 120 is configured to classify the defective product as belonging to a distribution of defective products and configured to control the actuator system 170 based on the output of the machine learning system 200 and/or a classification of the product 24 as being within the distribution of products 24 that are defective. In this non-limiting example, for instance, the actuator system 170 is configured to control an action of a robot or manufacturing machine based on the identification of the product 24 as being defective.

Additionally or alternatively to the first application (FIG. 1B) and the second application (FIG. 1C), the system 100 (and/or control system 120) is also operable in other applications. For example, the control system 120 is configured to generate training data, which are used to train these types of machine learning systems 200. Furthermore, the system 100 (and/or control system 120) is also applicable in various fields, such as computer-controlled machines, robots, home-appliances, power tools, electronic personal assistants, healthcare/medical systems, mobile machines, security systems, simulation systems, etc. Furthermore, the system 100 (and/or control system 120 and/or machine learning system 200) is not limited to the above-mentioned applications, but can be applied to any suitable application that benefits from a machine learning system 200 with at least one trained generative model, which is provably robust to perturbations.

Figure 2A:
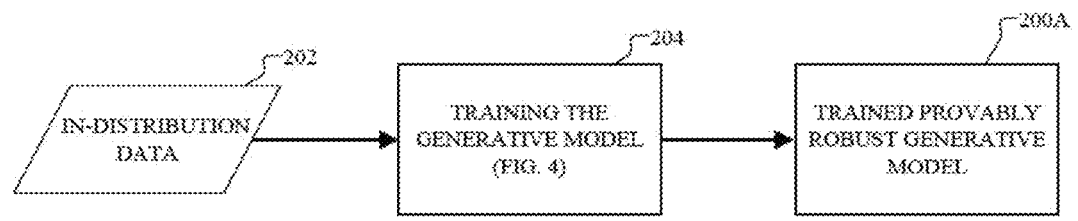
FIG. 2A is a flow diagram associated with training a provably robust deep generative model according to an example embodiment of this disclosure.
Figure 4:
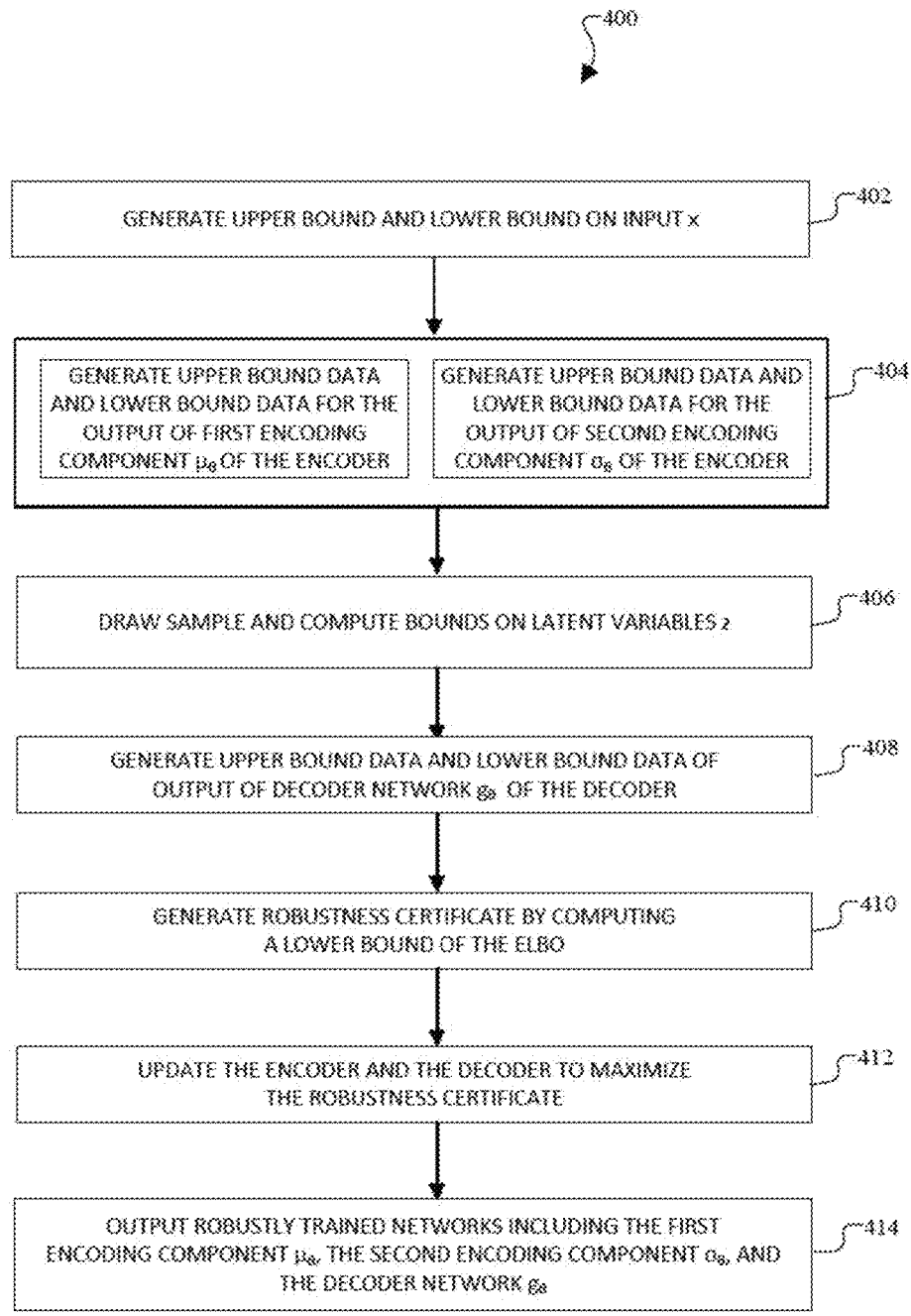
FIG. 4 is a flow diagram of a method of training a provably robust deep generative model according to an example embodiment of this disclosure.

FIG. 2A illustrates a flow diagram relating to a training process 204 for the machine teaming system 200 to generate at least one provably robust generative model (e.g., PROVAE 200A) according to an example embodiment. As shown in FIG. 2A, the generative model (e.g. VAE) is trained with in-distribution data 202 via the training process 204 (FIG. 4). As an example, the in-distribution data 202 refers to input data, which is selected or taken from a distribution of $x \in \mathcal{D}$, which is associated with the generative model. This feature is advantageous as the provably robust generative model does not require other types of training data (e.g., out-of-distribution data, perturbation data, adversarial examples, etc.) during the training process 204.

Upon completing the training process 204 with the in-distribution data 202, the trained provably robust generative model (e.g., PROVAE 200A) is generated and ready for operation.

Figure 2B:
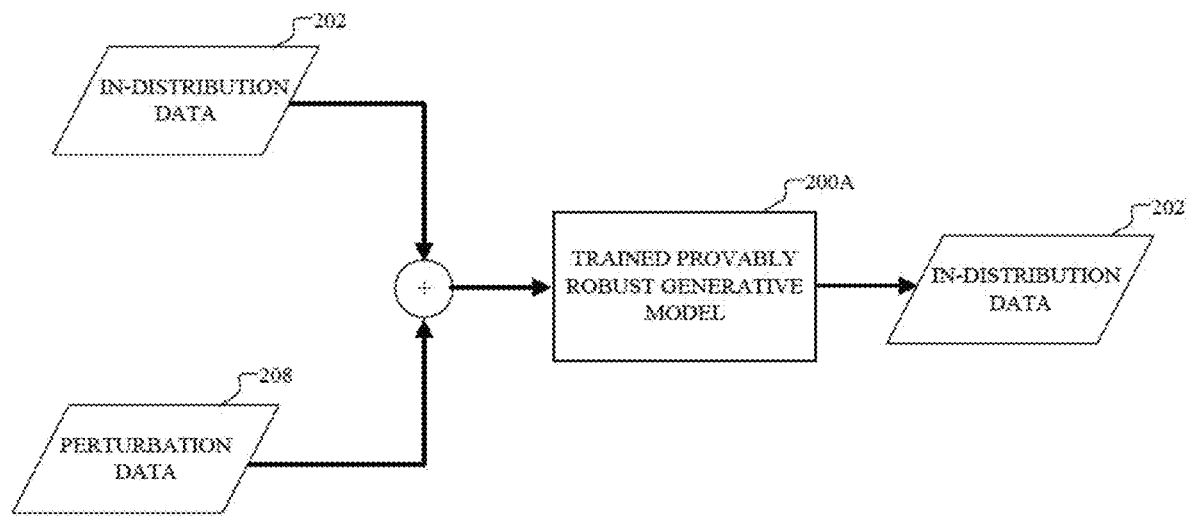
FIG. 2B is a flow diagram associated with operating the trained provably robust deep generative model of FIG. 2A according to an example embodiment of this disclosure.

FIG. 2B illustrates a flow diagram associated with an operation of the machine learning system 200, which includes at least one trained provably robust generative model (e.g., PROVAE 200A) according to an example embodiment. This flow diagram highlights the advantages of the provably robust generative model. For example, as an advantage, upon receiving input data, which includes in-distribution data 202 perturbed by perturbation data 208, then the PROVAE 200A is operable to identify this input data as being in-distribution data and also generate output data that is in-distribution data 202. Alternatively, although not shown, upon receiving input data, which includes in-distribution data 202 that is not perturbed by perturbation data, then the PROVAE 200A is configured to generate output data that is in-distribution data 202.

Figure 3A:
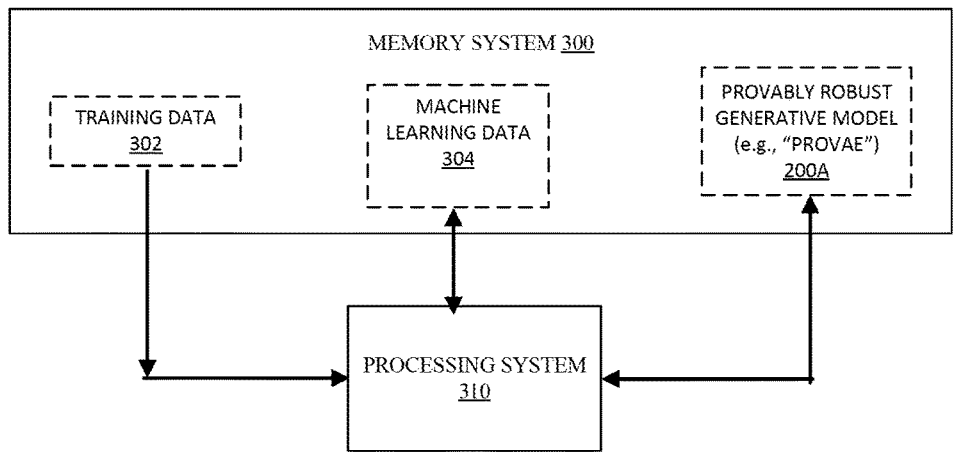
FIG. 3A is a block diagram associated with training the provably robust deep generative model according to an example embodiment of this disclosure

FIG. 3A is a block diagram associated with training the provably robust deep generative model according to an example embodiment. As shown in FIG. 3A, the training process 204 involves at least a memory system 300 and a processing system 310. In an example embodiment, the memory system 300 is a computer or electronic storage system, which is configured to store and provide access to various data to enable at least the operations and functionality, as disclosed herein. In an example embodiment, the memory system 300 comprises a single device or a plurality of devices. In an example embodiment, the memory system 300 includes electrical, electronic, magnetic, optical, semi-conductor, electromagnetic, or any suitable technology. For instance, the memory system 300 includes RAM, ROM, flash memory, a disk drive, a memory card, an optical storage device, a magnetic storage device, a memory module, any suitable type of memory device, or any combination thereof. In an example embodiment, with respect to the processing system 310, the memory system 300 is local, remote, or a combination thereof (e.g., partly local and partly remote). For example, the memory system 300 is configured to include at least a cloud-based storage system (e.g. cloud-based database system), which is remote from the processing system 310.

In an example embodiment, as shown in FIG. 3A, the memory system 300 includes at least training data 302, machine learning data 304, and the provably robust generative model ("PROVAE") 200A. The training data 302 includes at least sensor data (and/or image data based on the sensor data). Advantageously, the training process 204 is operable to train for admissible perturbations without requiring perturbations as input data. Also, the machine learning data 304 includes machine learning algorithms associated with a method 400 (FIG. 4) for training and generating the PROVAE 200A, as well as other relevant data 304A (FIG. 3B) such as the various bounding data (e.g., vector data), the robustness certificate, etc. The PROVAE 200A includes neural network data (e.g., various layers, parameter data, $\epsilon_{train}$ data, etc.), which are associated its training and/or operation. Upon completing the training process 204, the PROVAE 200A is deployable and/or employable by the system 100 of FIG. 1A or any suitable application.

Upon receiving training data 302 (e.g., sensor data and/or image data based on the sensor data), the processing system 310 is configured to train the generative model in connection with the machine learning data 304. In this regard, the processing system 310 includes at least one processor. For example, the processing system 310 includes an electronic processor, a CPU, a GPU, a microprocessor, a FPGA, an ASIC, any suitable processing technology, or any combination thereof. In an example embodiment, the processing system 310 communicates with the memory system 300 to generate the trained provably robust generative model ("PROVAE") 200A based on the training data 302 and the machine learning data 304.

Figure 3B:
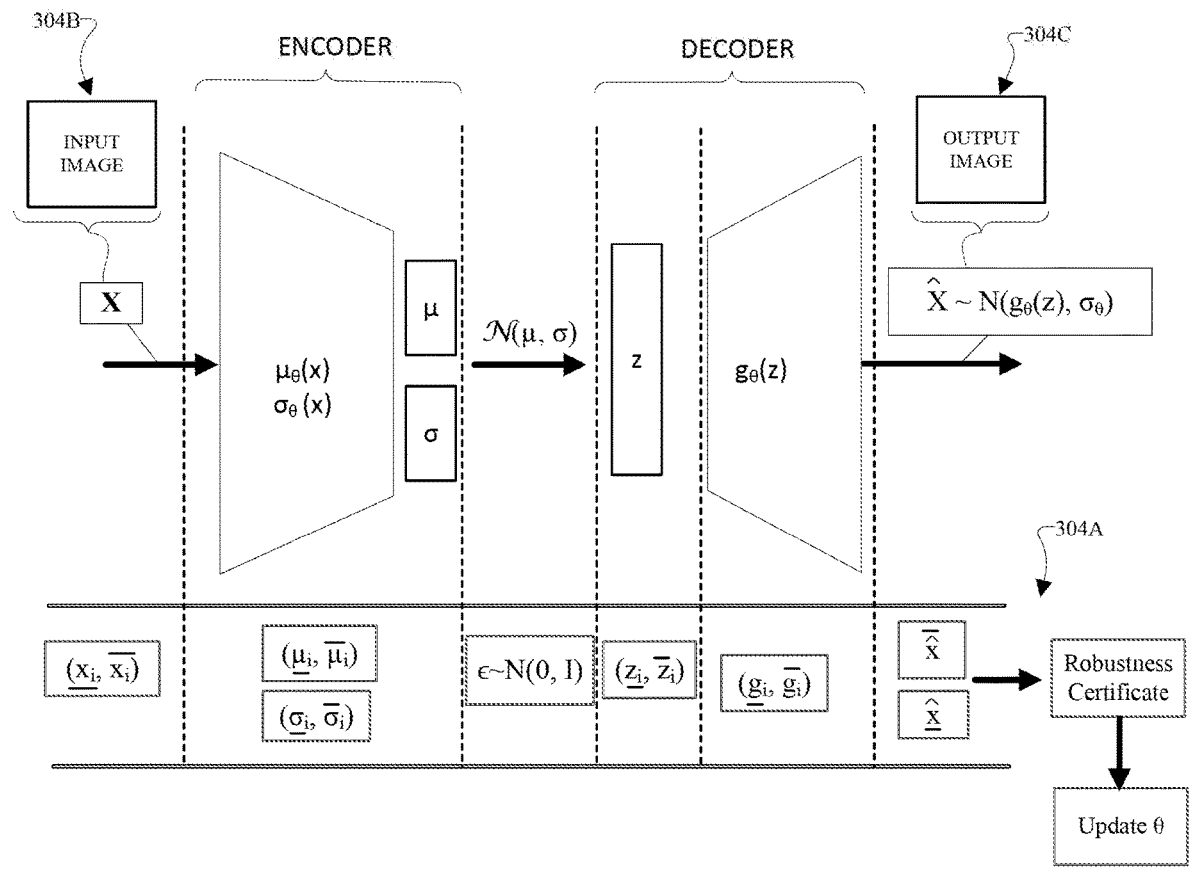
FIG. 3B is a conceptual diagram of training a provably robust deep generative model that includes a variational autoencoder according to an example embodiment of this disclosure.

FIG. 3B illustrates a conceptual diagram of training a generative model (e.g., VAE) to generate a provably robust generative model (e.g., PROVAE 200A) according to an example embodiment. In general, the VAE includes at least an encoder with an encoder network and a decoder with a decoder network. In this regard, the encoder includes a recognition model while the decoder includes a generative model, respectively. In an example embodiment, as shown in at least FIG. 3B, the encoder and decoder use Interval bound propagation (IBP) techniques to propagate an effect of a perturbation on the input. The effect of the perturbation is propagated throughout the VAE. Also, for convenience, FIG. 3B illustrates a mapping of some components (e.g., $\mu(x)$, $\sigma(x)$, $g(z)$, etc.) of the VAE, as well as some representations of other relevant data 304A, in relation to the VAE, to help illustrate the provably robust training process together with FIG. 4. Also, FIG. 3B illustrates an example of sensor data x (e.g., input image 304B with a handwritten digit of '4') and an example of output data $\hat{x}$, which is a reconstruction of the sensor data (e.g., output image 304C with a reconstructed handwritten digit of '4'). The input image 304B and the output image 304C are both identified as in-distribution data (or within a distribution of "handwritten digits").

In general, the VAE is trained based upon a bound on the log-likelihood, which the processing system 310 is configured to further bound in the adversarial setting. The VAE is trained based upon the so-called evidence lower bound (ELBO) L(x), which expresses the probability p(x) in terms of a latent variable $z \in R^k$ and then bounds the likelihood as $$\log p(x) = \log \int p(x|z)p(z)dz \geq \mathbb{E}_{z \sim q(z|x)}[\log p(x|z)] - KL(q(z|x)\|p(z)) \equiv L(x) \quad (1)$$

where q(z|x) is a so-called variational distribution, that attempts to approximate the posterior p(z|x) (for which case the bound is tight), but which does so via a more tractable distribution class. In the VAE setting, the processing system 310 selects $$q(z|x) = \mathcal{N}(z; \mu_\theta(X); \sigma_\theta^2(x)I) \quad (2)$$

$$p(x|z) = \mathcal{N}(x; g_\theta(z); \sigma_0^2 I) \quad (3)$$

$$p(z) = \mathcal{N}(z; 0, I) \quad (4)$$

where $\mu_\theta(x)$ and $\sigma_\theta^2(x)$ are the encoder networks that predict the mean and variance of the Normal distribution q from the input x and $g_\theta(z)$ is the decoder network that generates a sample in input space given a latent vector z.

Under these assumptions, the ELBO has the following explicit form:

$$L(x, \theta) = \frac{1}{2} \left( \mathbb{E}_{z \sim \mathcal{N}(\mu(x), \sigma_\theta^2(x)I)} [\sigma_0^2 \|x - g_\theta(z)\|_2^2] + 1^T(\log \sigma_\theta^2(x) - \sigma_\theta^2(x)) - \|\mu_\theta(x)\|^2 \right) + c \quad (5)$$

where c is a constant. In general, the encoder and decoder networks are jointly trained to maximize the lower bound as represented by the following equation:

$$\max_\theta \mathbb{E}_{x \sim D}[L(x; \theta)] \quad (6)$$

using, for example, stochastic gradient descent, where the processing system 310 replaces the sampling procedure $z \sim \mathcal{N}(\mu(x); \sigma^2(x)I)$ with the equivalent process $z = \mu(x) + \sigma(x) \cdot \delta \sim \mathcal{N}(0, I)$ to draw a sample and ensure that the mean and variance terms can be backpropagated through via a so-called reparameterization technique.

FIG. 4 illustrates a flow diagram of a method 400 of the training process 204 for generating a provably robust generative model (e.g., PROVAE 200A) according to an example embodiment. This method 400 provides a solution to the technical problem of formulating a robust defense against out-of-distribution attacks on deep generative models. The method 400 achieves such defense by obtaining a provable robust deep generative model (e.g. PROVAE 200A) that lower-bounds the ELBO for admissible perturbations. More specifically, the method 400 identifies $\Delta_{\epsilon_{train}}(x)$ as the set of admissible perturbations, and $t_\infty$ as a ball of radius $\epsilon_{train}$ centered around x. In this disclosure, for lightness of notation, these terms, $\Delta_{\epsilon_{train}}(x)$ and $\Delta(x)$, are used interchangeably.

The processing system 310 is configured to obtain a lower bound for the ELBO for all the possible perturbations $\delta \in \Delta(x)$ as $\underline{L}(x) \leq L(x+\delta) \leq \log(p(x+\delta))$. This lower bound provides a certificate of robustness of the ELBO. The effect on the ELBO of any possible perturbation in $\Delta(x)$ will be lower bound by $\underline{L}$. The optimization of the lower bound $\underline{L}$ effectively trains the network to be robust to the strongest possible out-of-distribution attack within $\Delta(x)$ ($t_\infty$ ball of radius $\epsilon_{train}$ around x).

In order to lower bound the ELBO, the processing system 310 performs IBP throughout the layers of $\mu_\theta$, $\sigma_\theta$, and $g_\theta$ such that the processing system 310 obtains bounds for the propagation of the admissible perturbations on the input space in terms of the ELBO. The processing system 310 is thus configured to bound both the Kullback-Leibler (KL) divergence of the perturbed input $KL(q(z|x+\delta)\|p(z))$ and the expected value of the perturbed conditional log-likelihood $\sigma_0^2 \|x-g_\theta(z)\|_2^2$. To do so, the processing system 310 performs IBP on the encoder networks $\mu_\theta$ and $\sigma_\theta$, and IBP on the decoder network $g_\theta$.

As preliminaries to the method 400, the processing system 310 propagates lower and upper bounds on building blocks of the encoder and decoder networks. In general, the building blocks include at least linear and convolution layers, and monotonic element-wise activation functions. These features enable the processing system 310 to sequentially connect the different interval bounds, from input to output of the deep neural network (e.g., the VAE). In this disclosure, for convenience and lightness of notation, the upper bound of p is denoted as $\overline{\mu}$ and the lower bound is denoted as $\underline{\mu}$, which are considered element-wise when addressing multidimensional entities.

With respect to linear operators, the processing system 310 considers $Wv$ to be a linear operator W applied to v, and $(\overline{v}, \underline{v})$ to be the element-wise upper and lower bounds of v. The processing system 310 decomposes the linear operator W into positive and negative operators $W=W_+ + W_-$ such that $W_+ = \max(W,0)$ and $W_- = \min(W,0)$, where max and min correspond to element-wise maximum and minimum. The processing system 310 then applies the upper and lower bounds of the linear operator to v. More specifically, the processing system 310 applies the upper bound (equation 7) and the lower bound (equation 8), which hold for convolution layers and linear layers, due to their linear nature.

$$\overline{Wv} = W_+ \overline{v} + W_- \underline{v} \quad (7)$$

$$\underline{Wv} = W_+ \underline{v} + W_- \overline{v} \quad (8)$$

With respect to monotonic functions, the processing system 310 is configured to denote $v^t = h(v^{t-1})$ as a monotonic (non-decreasing or non-increasing) function applied element-wise on $v^{t-1}$. The processing system 310 expresses the upper and lower bounds of $v^t$ in terms of h and the upper and lower bounds of $v^{t-1}$ as follows, $$\overline{v^t} = \max\{h(\overline{v^{t-1}}), h(\underline{v^{t-1}})\} \quad (9)$$

$$\underline{v^t} = \min\{h(\overline{v^{t-1}}), h(\underline{v^{t-1}})\} \quad (10)$$

These bounds hold for monotonic activation functions, such as ReLU and sigmoid.

With respect to $\ell_2$ norm squared, the processing system 310 is configured to obtain lower and upper bounds of the $\ell_p$ norm squared of v by recognizing that there is an element-wise dependency on the lower and upper bounds of v. As $\|v\|_2^2 = \Sigma_{i=1}^n v_i^2$, where $v^i$ denotes the ith component of v, the processing system 310 obtains the respective upper and lower bounds as a function of $\overline{v}$ and $\underline{v}$ as follows, $$\overline{\|v\|^2} = \sum_{i=1}^n \max\{\overline{v_i^2}, \underline{v_i^2}\} \quad (11)$$

$$\underline{\|v\|^2} = \sum_{i=1}^n \min\{\overline{v_i^2}, \underline{v_i^2}\} \quad (12)$$

After the preliminaries are performed, the processing system 310 implements the method 400 to optimize the robustness certificate obtained from the worst-case perturbation, for example, in terms of at least one log-likelihood function. The method 400 includes one or more iterations (or epochs). In this case, each iteration (or epoch) includes computing the robustness certificate through bound propagation (e.g., steps 402-412) and optimizing the robustness certificate (e.g., step 414), thereby providing robustly trained encoder and decoder networks (e.g., step 416). Referring to FIG. 4, the method 400 includes at least the following implementation, as described below.

At step 402, the processing system 310 is configured to obtain an input x, and generate at least one bound on the input x. For example, the input x includes training data, such as $X = \{x_1, \ldots, x_n\}$ and where $x_i \in \mathbb{R}^M$. For $x \in X$, the processing system 310 is configured to generate input bounding data on the input $x_i$. The input bounding data includes upper bound data on the input $x_i$ and lower bound data on the input $x_i$.

Also, given the first encoding component $\mu_\theta(x)$ and the second encoding component $\sigma_\theta(x)$, the processing system 310 constructs the encoder networks to be a succession of convolutional layers with ReLU activations with at least one last layer being at least one fully connected linear layer. In addition, without requiring perturbations as input x, the processing system 310 is operable to consider any admissible perturbed input $x_i + \delta$, by defining perturbation data as $\delta \in \Delta_{\epsilon_{train}}(x_i)$, and by representing the lower bound and upper bound of the admissible perturbed input, as follows:

$$\underline{x_i} = x_i - \epsilon_{train} \mathbf{1} \quad (13)$$

$$\overline{x_i} = x_i - \epsilon_{train} \mathbf{1} \quad (14)$$

At step 404, the processing system 310 is configured to generate bounds for outputs of the encoder network. These bounds include first bounding data and second bounding data of the VAE. The first and second bounding data relate to the respective outputs of the first and second encoding components of the encoder. More specifically, the processing system 310 is configured to generate first upper bound data and first lower bound data for the output of the first encoding component $\mu_\theta(x)$. In addition, the processing system 310 is configured to generate second upper bound data and second lower bound data for the output of the second encoding component $\sigma_\theta(x)$. The processing system 310 is configured to generate the first bounding data of the first encoding component $\mu_\theta(x)$ independently of the second bounding data of the second encoding component $\sigma_\theta(x)$. In this regard, the processing system 310 is configured to generate the first bounding data and the second bounding data at the same time or at different times.

With the propagation of the interval bounds for linear and convolution layers in equations 7-8 and for the activation functions in equations 9-10, the processing system 310 is configured to bound the outputs of the encoder network based on the IBP of $\underline{x}_i$ and $\overline{x}_i$ throughout the components of the encoder network via $$\underline{\mu}_i = \min\{\underline{\mu}_\theta(\underline{x}_i), \underline{\mu}_\theta(\overline{x}_i)\} \tag{15}$$

$$\overline{\mu}_i = \max\{\overline{\mu}_\theta(\underline{x}_i), \overline{\mu}_\theta(\overline{x}_i)\} \tag{16}$$

$$\underline{\sigma}_i = \min\{\underline{\sigma}_\theta(\underline{x}_i), \underline{\sigma}_\theta(\overline{x}_i)\} \tag{17}$$

$$\overline{\sigma}_i = \max\{\overline{\sigma}_\theta(\underline{x}_i), \overline{\sigma}_\theta(\overline{x}_i)\} \tag{18}$$

where $\mu_i = \mu_\theta(x_i)$ and $\sigma_i = \sigma_\theta(x_i)$ are the outputs of the encoder, $\underline{\mu}_\theta$ and $\overline{\mu}_\theta$ and $\underline{\sigma}_\theta$ and $\overline{\sigma}_\theta$ correspond to the propagation of the lower and upper bounds of the encoder networks respectively. This results in bounds for the outputs of the encoding components $\mu_i$ and $\sigma_i$, as well as log $\sigma_i$ (as logarithm and exponential are monotonic non-decreasing) as function of the magnitude $\epsilon_{train}$ of the perturbation $\Delta(x_i)$.

Given the bounds on the outputs of the encoder network, the processing system 310 is configured to bound the KL divergence between $\mathcal{N}(\mu_i, \sigma_i I)$ and $\mathcal{N}(0, I)$ via $$\underline{KL} = -\frac{1}{2} \sum_{j=1}^{J} \left( 1 + \max\{\log(\overline{\sigma_i})_j^2 - (\overline{\sigma_i})_j^2, \log(\underline{\sigma_i})_j^2 - (\underline{\sigma_i})_j^2\} - \left(\min\{(\overline{\mu_i})_j^2, (\underline{\mu_i})_j^2\}\right) \right) \tag{19}$$

$$\overline{KL} = -\frac{1}{2} \sum_{j=1}^{J} \left( 1 + \min\{\log(\overline{\sigma_i})_j^2 - (\overline{\sigma_i})_j^2, \log(\underline{\sigma_i})_j^2 - (\underline{\sigma_i})_j^2\} - \left(\max\{(\overline{\mu_i})_j^2, (\underline{\mu_i})_j^2\}\right) \right) \tag{20}$$

where $(\mu_i)_j^2$ and $(\sigma_i)_j^2$ denote the jth component of the squared mean and covariance of the ith sample, as outputted by the encoder. In addition, the processing system 310 is configured to continue from the bounds on $\mu_i$ and $\sigma_i$ at an end portion of the encoder networks to enable IBP to be performed via the decoder network.

At step 406, the processing system 310 is configured to draw at least a sample, denoted as "$\epsilon$," and compute bounds on latent variable, denoted as "z." For example, the processing system 310 is configured to obtain bounds (or third bounding data of the VAE) on the latent variable via a reparameterization technique. More specifically, with the reparameterization technique, the bound on the latent variable follows from the bound for linear operators in equations 7-8, as the reparameterization is a linear operator.

For example, the processing system 310 is configured to process a sample, as denoted by $\epsilon \sim \mathcal{N}(0, I)$, $\epsilon_+ = \max(\epsilon, 0)$, and $\epsilon_- = \min(\epsilon, 0)$ such that $\epsilon = \epsilon_+ + \epsilon_-$, where 0 represents the mean and I represents an identity vector for the covariance. This reparameterization technique decouples the randomness from the encoder by expressing the latent variable as $z_i = \mu_i + \sigma_i \epsilon$. After using the reparameterization technique, the processing system 310 is configured to bound the latent variable $z_i$ (e.g., generate the third bounding data), which is represented as $$\underline{z}_i = \underline{\mu}_i + \overline{\sigma}_i \epsilon_- + \underline{\sigma}_i \epsilon_+ \tag{21}$$

$$\overline{z}_i = \overline{\mu}_i + \underline{\sigma}_i \epsilon_- + \overline{\sigma}_i \epsilon_+ \tag{22}$$

At step 408, the processing system 310 is configured to generate bounds for the output of the decoder network $g_\theta(x)$. In this regard, the processing system 310 is configured to generate fourth bounding data of the VAE, which includes fourth upper bound data and fourth lower bound data of the decoder network $g_\theta(x)$. For example, after step 408, the bounds on the latent variable (i.e., z) are then propagated through the decoder network $g_\theta$, which includes linear and convolutional layers (e.g., linear operators where bounds can be propagated with equations 7-8) with ReLU and sigmoid activations (e.g., monotonic activation functions where bounds can be propagated with equations 9-10). Accordingly, the processing system 310 to provide bounds on the output of the decoder network as a function of the bounds on the latent vector $z_i$, as with the encoder networks.

In addition, the processing system 310 addresses the problem of bounding the conditional log-likelihood log $p(x_i | z_i)$. To do so, the processing system 310 fixes the diagonal covariance $\sigma_\theta I$ in $p(x_i | z_i) = \mathcal{N}(x; g_\theta(z_i), \sigma_\theta^2 I)$. The processing system 310 thus reduces the problem of bounding the conditional log-likelihood to a problem of bounding $\|x_i - g_\theta(z_i)\|^2$. Upon solving equations 11-12, the processing system 310 is configured to bound this function via $$\overline{\|x_i - g_\theta(z_i)\|^2} = \sum_{j=1}^{M} \max\left\{ \left(x_i + \epsilon_{train} 1 - \underline{g_\theta(z_i)}\right)^2, \left(x_i - \epsilon_{train} 1 - \overline{g_\theta(z_i)}\right)^2 \right\}_j \tag{23}$$

$$\underline{\|x_i - g_\theta(z_i)\|^2} = \sum_{j=1}^{M} \min\left\{ \left(x_i + \epsilon_{train} 1 - \underline{g_\theta(z_i)}\right)^2, \left(x_i - \epsilon_{train} 1 - \overline{g_\theta(z_i)}\right)^2 \right\}_j \tag{24}$$

where the processing system 310 is configured to take the element-wise max and min and sum in j across the elements of x.

At step 410, the processing system 310 is configured to generate a robustness certificate by generating at least one bound for the ELBO L, which serves as a loss function. More specifically, the processing system 310 is configured to generate lower bound data on the ELBO. For example, the processing system 310 combines the upper and lower bounds for the encoder network and decoder networks, and associated lower bounds on the conditional log-likelihood and upper bound on the KL divergence, as the ELBO takes into account the negative of the KL divergence, thereby obtaining lower bound data from the following lower bound:

$$\underline{L(x_i; \theta)} = \frac{1}{2} \tag{25}$$

$$\sum_{j=1}^{J} \left( 1 + \min\{\log(\overline{\sigma_i})_j^2 - (\overline{\sigma_i})_j^2, \log(\underline{\sigma_i})_j^2 - (\underline{\sigma_i})_j^2\} - \left(\max\{(\overline{\mu_i})_j^2, (\underline{\mu_i})_j^2\}\right) \right) +$$

$$\frac{1}{2\sigma_0^2} \mathbb{E}_{\epsilon \sim \mathcal{N}(0, I)} \sum_{j=1}^{M} \min\left\{ \left(x_i + \epsilon_{train} 1 - \underline{g_\theta(\underline{z}_i)}\right)^2, \left(x_i - \epsilon_{train} 1 - \overline{g_\theta(\underline{z}_i)}\right)^2, \right.$$

$$\left. \left(x_i + \epsilon_{train} 1 - \underline{g_\theta(\overline{z}_i)}\right)^2, \left(x_i - \epsilon_{train} 1 - \overline{g_\theta(\overline{z}_i)}\right)^2 \right\}$$

where the upper and lower bounds for the encoder networks are propagated, and the reparameterization technique as $$\underline{z}_i = \underline{\mu}_i + \overline{\sigma}_i \in_- + \underline{\sigma}_i \in_+ \quad (26)$$

$$\overline{z}_i = \overline{\mu}_i + \underline{\sigma}_i \in_- + \overline{\sigma}_i \in_+ \quad (27)$$

$$\underline{\mu}_i = \min\{\mu\theta(x_i + \in_{train}1), \mu_\theta(x_i - \in_{train}1)\} \quad (28)$$

$$\overline{\mu}_i = \max\{\mu\theta(x_i + \in_{train}1), \mu_\theta(x_i - \in_{train}1)\} \quad (29)$$

$$\underline{\sigma}_i = \min\{\sigma_\theta(x_i + \in_{train}1), \sigma_\theta(x_i - \in_{train}1)\} \quad (30)$$

$$\overline{\sigma}_i = \max\{\sigma_\theta(x_i + \in_{train}1), \sigma_\theta(x_i - \in_{train}1)\} \quad (31)$$

The resulting lower bound on the ELBO lower bounds the log-likelihood of a perturbed sample log $p(x_i+\delta)$, working as a robustness certificate for the perturbation. This means that if $\underline{L} \geq \alpha$ with input interval bounds fed into the encoder being $x_i - \in_{train}1$ and $x_i + \in_{train}1$ (an $\ell_\infty$ ball centered in $x_i$ of radius $\in_{train}$), this guarantees that log $p(x+\delta) \geq \alpha$ for all $\delta : \|\delta\|_\infty \leq \in_{train}$.

The method 400 includes training the VAE by optimizing the lower bound. For example, the processing system 310 trains the provably robust deep generative model by optimizing the lower bound of the ELBO $\underline{L}$, corresponding to optimizing the robustness certificate, instead of optimizing the ELBO L directly.

At step 414, the processing system 310 is configured to update encoder network and decoder network to optimize the lower bound of the ELBO. For example, the processing system 310 is operable to update the parameters of the VAE and maximize the lower bound of the ELBO L directly. In this case, the parameters (i.e., θ) include at least internal weights, which are associated with the encoder and decoder networks of the VAE.

At step 416, the processing system 310 is configured to output robustly trained networks, which include at least the first encoder network $\mu_\theta(x)$, the second encoder network $\sigma_\theta(x)$, and the decoder network $g_\theta(x)$. Once the processing system 310 outputs the robustly trained networks, the processing system 310 is configured to deploy or transmit the PROVAE 200A for use. For example, once robustly trained, the PROVAE 202 is deployable in and/or employable by the system 100 of FIG. 1A or any suitable application.

Furthermore, the method 400 is not limited to the steps shown in FIG. 4, but can include various modifications provided that the method 400 provides similar or substantially similar functions, effects, and/or results. In this regard, as an example of a modification, instead of IBP, the method 400 is configured to include other bound propagation techniques insteps 404, 406, and 410. These other bound propagation techniques may provide tighter bounds, but at a higher complexity cost than that provided by IBP. As another example of a modification, the method 400 includes performing steps 408, 410, and 412 more than once (e.g., a set number of times) and averaging the results for that set. Additionally or alternatively, the method 400 includes implementing a Monte Carlo integration to solve $\mathbb{E}_{\epsilon \sim \mathcal{N}(0,I)} [\sigma_o^2 \|x - g_\theta(z)\|_2^2]$. As yet another example of a modification, the method 400 further comprises classifying the output of the generative model via a classifier such that a new robustness certificate encompasses a penalty on misclassified samples that enforces not only bounding a decrease in the log-likelihood, but also ensures that the classification output will not be altered by noise or an adversarial attack.

Figure 5A:
FIGS. 5A, 5B, 5C, and 5D illustrate non-limiting examples of input data according to an example embodiment of this disclosure.
Figure 5B:
Figure 5C:
Figure 5D:

FIGS. 5A, 5B, 5C, and 5D illustrate non-limiting examples of input data according to an example embodiment. These examples of input data include sample images (e.g., images of handwritten digits) taken from the Modified National Institute of Standards and Technology database ("MNIST database"). More specifically, FIG. 5A illustrates an unperturbed sample of input data, which includes image data 500, which is unperturbed and does not include perturbation data. In contrast, FIGS. 5B-5D illustrate adversarial examples of input data, which includes that same image data 500 that has been perturbed by perturbation data. For instance, FIG. 5B illustrates an adversarial example 502, which includes the image data 500 (FIG. 5A) together with a projected gradient descent (PGD) attack on the PROVAE. Meanwhile, FIG. 5C illustrates an adversarial example 504, which includes the image data 500 (FIG. 5A) with a PGD attack of $\in_{train} = 0.01$ on the PROVAE 200A. FIG. 5D illustrates adversarial example 506, which includes the image data 500 (FIG. 5A) with a PGD attack of $\in_{train} = 0.1$ on the PROVAE 200A.

In example assessments, the VAE and the PROVAE 200A are evaluated based on the unperturbed samples of image data 500. When this unperturbed sample of image data 500 is presented as input data to a VAE, then the loss is represented as L=−28.28. As a comparison, for example, when the unperturbed sample of image data 500 is presented as input data to a PROVAE 200A with $\in_{train} = 0.01$, then the loss is represented as L=−31.10. As another comparison, for example, when the unperturbed sample of image data 500 is presented as input data to a PROVAE 200A with $\in_{train} = 0.1$, then the loss is represented as L=−41.31. As demonstrated by these assessments, there is not a significant difference in performance between the VAE and the PROVAE 200A. Moreover, as demonstrated by the loss values, the VAE and the PROVAE 200A are operable to identify and process the image data 500 correctly as being in-distribution data and within a range of handwritten digits.

In other example assessments, the VAE and the PROVAE 200A are evaluated based on the perturbed samples of input data in which the image data 500 (FIG. 5A) is perturbed by perturbation data. In this regard, when comparing the VAE to the PROVAE 200A with respect to these adversarial examples of attacked data, then the advantages of the PROVAE 200A are highlighted when compared to the VAE. More specifically, when the adversarial example 502 is presented as input data to the VAE, then the loss is represented as L=−113.97. That is, in this case, since L=−113.97, the VAE incorrectly interprets this adversarial example 502 as being out-of-distribution data (e.g. not within a range of handwritten digits) due to the attack of the perturbation data even though this adversarial example 502 does include the image data 500 of handwritten digits. In contrast, when the adversarial example 504 is presented as input data to the PROVAE 200A with $\in_{train} = 0.01$, then the loss is represented as L=−59.08, whereby the PROVAE 200A correctly identifies and processes this adversarial example 504 as being in-distribution data (e.g., within a range of handwritten digits), thereby exhibiting robustness compared to the VAE. As another comparison, when the adversarial example 506 is presented as input data to the PROVAE with $\in_{train} = 0.1$, then the loss is represented as L=−50.06, whereby the PROVAE 200A correctly identifies and processes this adversarial example 504 as being in-distribution data (e.g., within a range of handwritten digits), thereby exhibiting robustness compared to the VAE. Moreover, the benefits of the PROVAE 200A are also illustrated in FIGS. 6A and 6B, which include comparisons of the VAE to the PROVAE 200A.

Figure 6A:
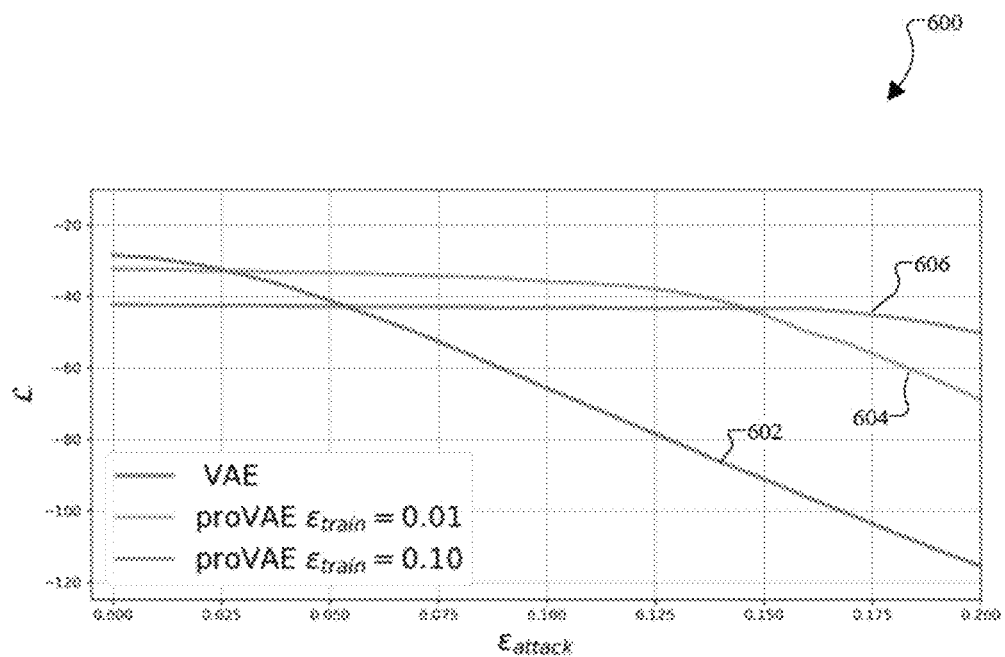
FIG. 6A illustrates a graph with representations of the effects of adversarial attacks on a first dataset in association with different generative models according to an example embodiment.
Figure 6B:
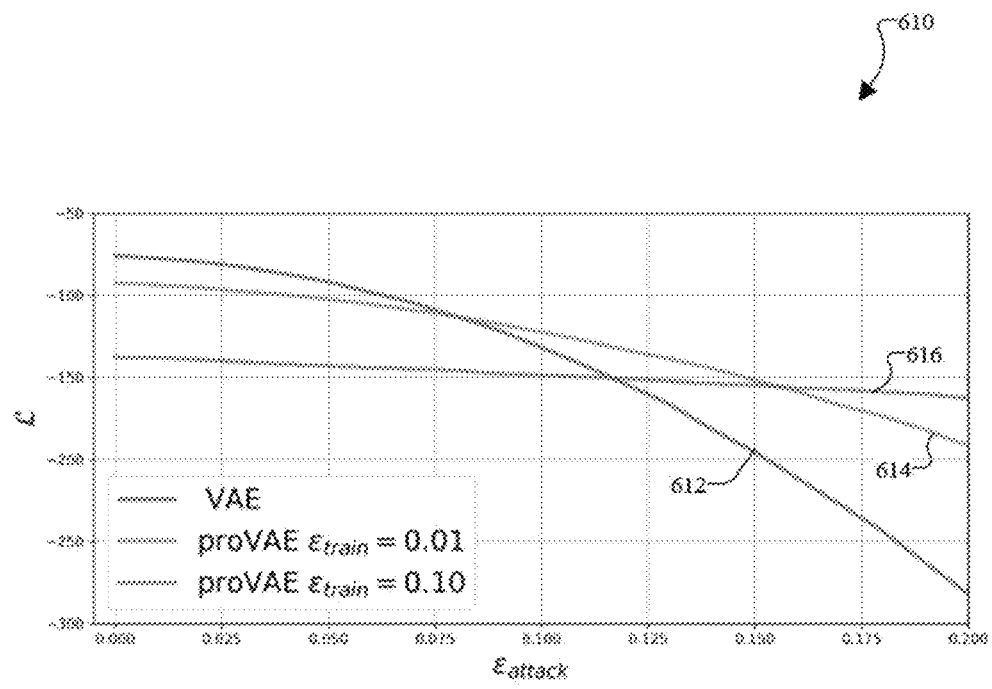
FIG. 6B illustrates a graph with representations of the effects of adversarial attacks on a second dataset in association with different generative models according to an example embodiment.

FIGS. 6A and 6B illustrate graphs with graphical representations of the effects of adversarial attacks (e.g., a PGD attack in an $\ell_\infty$ ball of radius $\in_{attack}$ for $0 \leq \in_{attack} \leq 0.2$) on the loss, as represented by the ELBO L, for classifiers trained with different values of $\in_{train}$. FIG. 6A illustrates a graph 600 based on a first dataset (e.g., sample images from MNIST database), whereas FIG. 6B illustrates a graph 610 based on a second dataset (e.g., sample images from the Canadian Institute For Advanced Research (CIFAR10) database). In FIG. 6A, the VAE representation 602 corresponds to $\in_{train}=0$ based on the first dataset. In FIG. 6B, the VAE representation 612 corresponds to $\in_{train}=0$ based on the second dataset. Each of the VAE representations 602 and 612 clearly illustrates the fast decay of the loss L for the non-robust classifier and how training a provably robust classifier mitigates this decay at the expense of a lower value of L on unperturbed data in which $\in_{attack}=0$. In addition, for comparison, FIGS. 6A and 6B illustrate proVAE ($\in_{train}=0.01$) representations 604 and 614 based on the first dataset and the second dataset, respectively. Also, for comparison, FIGS. 6A and 6B illustrate proVAE ($\in_{train}=0.10$) representations 606 and 616 based on the first dataset and the second dataset, respectively. Accordingly, as shown in FIGS. 6A and 6B, each of the proVAE representations 604, 606, 614, and 616 performs better for increasing $\in_{attack}$ compared to the VAE representations 602 and 612.

As described herein, the embodiments include a number of advantageous features and benefits. For example, the embodiments relate to training and generating provably robust generative models, which are based on defining robust lower bounds to the variational lower bounds of the likelihoods (i.e., the ELBO) and optimizing these lower bounds to train the provably robust generative models. These embodiments introduce provable defenses against adversarial attacks in the domain of generative models, namely out-of-distribution attacks, where a sample within the distribution of the model is perturbed to lower its likelihood.

In addition, FIGS. 6A-6B corroborate the effectiveness of this provable defense, and introduce other trade-offs associated with model robustness. For example, FIGS. 6A-6B show that the PROVAEs 200A provide better defenses against adversarial attacks (e.g., by exhibiting higher log-likelihood at higher values of $\in_{attack}$ as $\in_{train}$ increases) compared to VAEs, which have not been robustly trained via the training process of FIG. 4. Moreover, the teachings in this disclosure are extendible into directions of improvement that relate to creating defenses against into-distribution attacks, where adversarial attacks can perturb a sample out-of-distribution ($x \notin \mathcal{D}$) to make it appear as if it comes from distribution ($x \in \mathcal{D}$).

Also, the embodiments are advantageous in providing technical solutions to the technical problems associated with the susceptibility of machine learning systems (e.g., deep generative models) to adversarial attacks. These adversarial attacks have been known to causes imperceptible changes to input data, which may lead to drastic changes in likelihood functions, thereby providing incorrect output data. In addressing this technical issue, the embodiments, as disclosed herein, provide provably robust generative models in which these small changes (e.g. perturbations) to the inputs of machine learning systems do not cause drastic changes in the likelihood functions of the machine learning systems. Accordingly, as discussed above, the embodiments described herein are advantageous in providing generative models with defensive solutions to adversarial attacks.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for training a machine learning system to be robust to perturbations, the method comprising:
    obtaining input data that includes sensor data and a radius of an $\ell_p$ norm ball of admissible perturbations;
    generating input bounding data based on the input data;
    generating first bounding data by propagating the input bounding data on a first output of an encoder network;
    generating second bounding data by propagating the input bounding data on a second output of the encoder network;
    generating third bounding data associated with a latent variable based on the first and second bounding data;
    generating fourth bounding data by propagating the third bounding data on an output of a decoder network;
    establishing a robustness certificate with respect to the input data by generating a lower bound of an evidence lower bound (ELBO) based on the first bounding data, the second bounding data, the third bounding data, and the fourth bounding data; and
    updating the encoder network and the decoder network based on the robustness certificate such that the machine learning system that includes the encoder network and the decoder network is robust with respect to defending against the admissible perturbations.

2. The computer-implemented method of claim 1, wherein:
    the ELBO includes a conditional log-likelihood function; and
    the step of updating the encoder network and decoder network includes optimizing the lower bound of the ELBO.

3. The computer-implemented method of claim 1, wherein the step of updating the encoder network and the decoder network comprises:
    updating parameters of the encoder network and the decoder network based on the lower bound of the ELBO to maximize the lower bound of the ELBO.

4. The computer-implemented method of claim 1, wherein:
    the machine learning system comprises a variational autoencoder that includes the encoder network and the decoder network; and the latent variable is associated with the variational autoencoder.

5. The computer-implemented method of claim 1, wherein:
the encoder network includes a first encoding component to produce the first output of the encoder network and a second encoding component to produce the second output of the encoder network;
the step of generating the first bounding data includes generating first upper bound data and first lower bound data of the first encoding component; and
the step of generating the second bounding data includes generating second upper bound data and second lower bound data of the second encoding component.

6. The computer-implemented method of claim 1, wherein the robustness certificate generates the lower bound of the ELBO to ensure that log $p(x+\delta) \geq L(x+\delta) \geq \underline{L}(x)$ for all $\delta$ that satisfy $\|\delta\|_\infty \leq \epsilon_{train}$, where
x represents the sensor data,
$\delta$ represents perturbation data,
$L(x+\delta)$ represents the ELBO based on the sensor data that is perturbed by the perturbation data,
$\underline{L}(x)$ represents the lower bound of the ELBO, and
$\epsilon_{train}$ represents the radius of the $\ell_p$ norm ball of the admissible perturbations.

7. The computer-implemented method of claim 1, wherein:
the input bounding data includes upper bound data and lower bound data of the input data;
the first bounding data includes first upper bound data and first lower bound data of the first output of a first encoding component of the encoder network;
the second bounding data includes second upper bound data and second lower bound data of the second output of a second encoding component of the encoder network;
the third bounding data includes third upper bound data and third lower bound data associated with the latent variable; and
the fourth bounding data includes fourth upper bound data and fourth lower bound data of an output of the decoder network.

8. A system comprising:
an actuator;
a sensor system including at least one sensor;
a non-transitory computer readable medium that stores a machine learning system having a variational autoencoder that is trained to be robust to perturbations, the variational autoencoder including an encoder network and a decoder network that are trained based on a robustness certificate that lower bounds a loss function of the machine learning system; and
a control system that controls the actuator based on communications with the sensor system and the machine learning system, the control system including at least one electronic processor that is operable to:
obtain input data that includes sensor data from the sensor system and perturbation data from a disturbance in which the sensor data is perturbed by the perturbation data;
process the input data via the machine learning system; and
generate output data via the machine learning system in which the output data is a reconstruction of the sensor data, the output data being associated with a likelihood that is unperturbed by the perturbation data;

wherein:
the sensor data and the output data are in-distribution data corresponding to a model distribution associated with the machine learning system;
the machine learning system identifies and processes the input data as being within a range of the in-distribution data even if the perturbation data is constructed to make the machine learning system identify and process the input data as being out-of-distribution data that is outside of the model distribution; and
prior to communications with the control system, the variational autoencoder is trained by a training process that includes:
generating input bounding data based on training data, the training data including other sensor data and a radius of an $\ell_p$ norm ball of admissible perturbations;
generating first bounding data by propagating the input bounding data on a first output of an encoder network;
generating second bounding data by propagating the input bounding data on a second output of the encoder network;
generating third bounding data associated with a latent variable based on the first and second bounding data;
generating fourth bounding data by propagating the third bounding data on an output of the decoder network;
establishing the robustness certificate with respect to the training data by generating a lower bound of an evidence lower bound (ELBO) based on the first bounding data, the second bounding data, the third bounding data, and the fourth bounding data; and
updating the encoder network and the decoder network based on the robustness certificate such that the machine learning system is robust with respect to defending against the admissible perturbations.

9. The system of claim 8, wherein:
the control system is operable to generate classification data upon classifying the output data;
the control system is operable to generate control data to the actuator based on the classification data; and
the actuator performs an action in response to the control data.

10. The system of claim 8, wherein the machine learning system is trained such that the step of updating the encoder network and the decoder network comprises:
updating parameters of the encoder network and the decoder network based on the lower bound of the ELBO to maximize the lower bound of the ELBO.

11. The system of claim 8, wherein the machine learning system is trained such that the robustness certificate generates the lower bound of the ELBO to ensure that log $p(x+\delta) \geq L(x+\delta) \geq \underline{L}(x)$ for all $\delta$ that satisfy $\|\delta\|_\infty \leq \epsilon_{train}$, where
x represents the sensor data,
$\delta$ represents perturbation data,
$L(x+\delta)$ represents the ELBO based on the sensor data that is perturbed by the perturbation data,
$\underline{L}(x)$ represents the lower bound of the ELBO, and
$\epsilon_{train}$ represents the radius of the $\ell_p$ norm ball of admissible perturbations.

12. The system of claim 8, wherein:
the input bounding data includes upper bound data and lower bound data of the training data;

the first bounding data includes first upper bound data and first lower bound data of an output of a first encoding component of the encoder network;

the second bounding data includes second upper bound data and second lower bound data of an output of a second encoding component of the encoder network;

the third bounding data includes third upper bound data and third lower bound data associated with the latent variable; and the fourth bounding data includes fourth upper bound data and fourth lower bound data of an output of the decoder network.

13. A non-transitory computer readable medium comprising at least computer-readable data, which when executed by an electronic processor, is operable to implement a method for training a machine learning system to be robust to perturbations, the method comprising:

obtaining input data that includes sensor data and a radius of an $\ell_p$ norm ball of admissible perturbations;

generating input bounding data based on the input data;

generating first bounding data by propagating the input bounding data on a first output of an encoder network;

generating second bounding data by propagating the input bounding data on a second output of the encoder network;

generating third bounding data associated with a latent variable based on the first and second bounding data;

generating fourth bounding data by propagating the third bounding data on an output of a decoder network;

establishing a robustness certificate with respect to the input data by generating a lower bound of an evidence lower bound (ELBO) based on the first bounding data, the second bounding data, the third bounding data, and the fourth bounding data; and updating the encoder network and the decoder network based on the robustness certificate such that the machine learning system that includes the encoder network and the decoder network is robust with respect to defending against the admissible perturbations.

14. The non-transitory computer readable medium of claim 13, wherein:

the ELBO includes a conditional log-likelihood function; and the step of updating the encoder network and decoder network includes optimizing the lower bound of the ELBO.

15. The non-transitory computer readable medium of claim 13, wherein the step of updating the encoder network and the decoder network comprises:

updating parameters of the encoder network and the decoder network based on the lower bound of the ELBO to maximize the lower bound of the ELBO.

16. The non-transitory computer readable medium claim 13, wherein:

the machine learning system comprises a variational autoencoder that includes the encoder network and the decoder network; and the latent variable is associated with the variational autoencoder.

17. The non-transitory computer readable medium of claim 13, wherein:

the encoder network includes a first encoding component and a second encoding component;

the step of generating the first bounding data includes generating first upper bound data and first lower bound data of the first output of the first encoding component; and the step of generating the second bounding data includes generating second upper bound data and second lower bound data of the second output of the second encoding component.

18. The non-transitory computer readable medium of claim 11, wherein the robustness certificate generates the lower bound of the ELBO to ensure that $\log p(x+\delta) \geq L(x+\delta) \geq \underline{L}(x)$ for all $\delta$ that satisfy $\|\delta\|_\infty \leq \in_{train}$, where
x represents the sensor data,
δ represents perturbation data,
L(x+δ) represents the ELBO based on the sensor data that is perturbed by the perturbation data,
$\underline{L}(x)$ represents the lower bound of the ELBO, and
$\in_{train}$ represents the radius of the $\ell_p$ norm ball of admissible perturbations.

* * * * *